Figure 1:
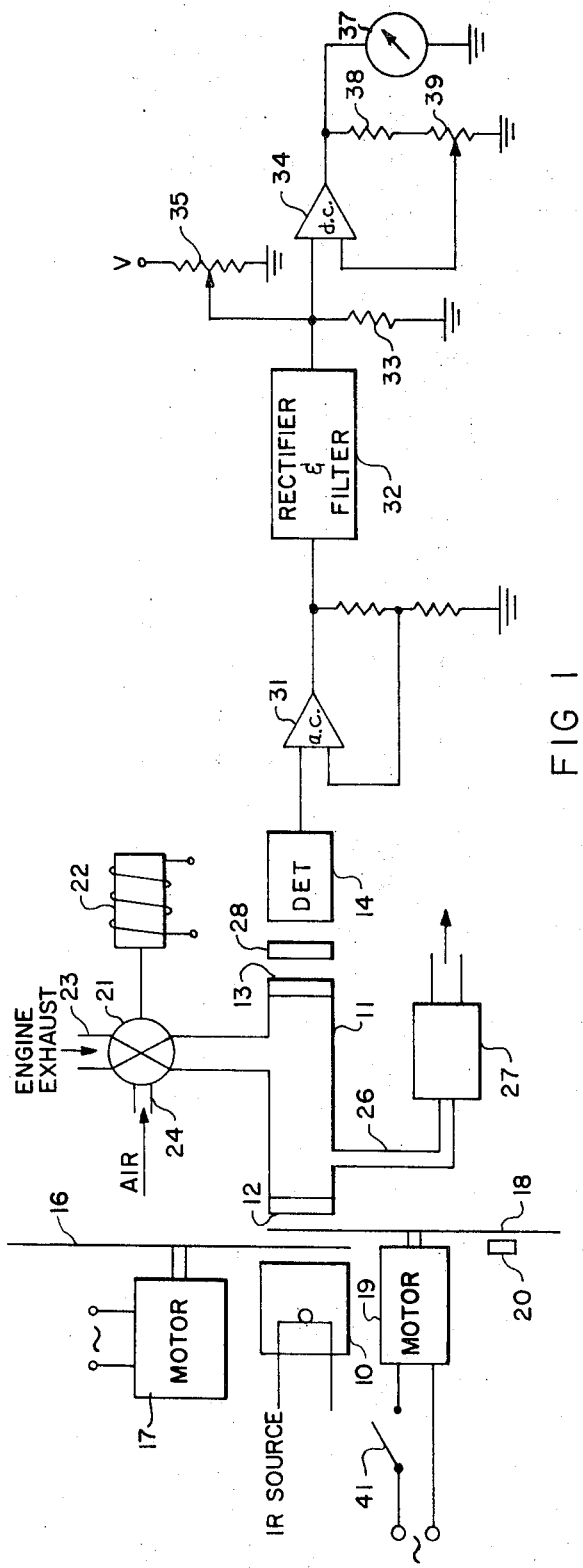

United States Patent

[11] 3,562,522

[72] Inventors Carl N. Cederstrand
Brea;
James C. Davis, Fullerton; Charles A. Keenan, Huntington Beach; Jerrold H. Randall, Corona Del Mar, Calif.
[21] Appl. No. 760,501
[22] Filed Sept. 18, 1968
[45] Patented Feb. 9, 1971
[73] Assignee Beckman Instruments, Inc.
a corporation of California

[54] NONDISPERSIVE IR ANALYZER AND METHOD FOR CALIBRATING
5 Claims, 2 Drawing Figs.
[52] U.S. Cl.................................................. 250/43.5,
250/83.3; 356/97
[51] Int. Cl..................................................... G01n 21/26
[50] Field of Search........................................ 250/43.5,
83C, 83.3(IR); 356/97

[56] References Cited
UNITED STATES PATENTS
3,454,880  7/1969  Ries et al. .................... 250/43.5X
OTHER REFERENCES
PHOTOMETRY, Third Edition; John W. T. Walsh; Constable & Co., Ltd., London; pp. 67— 72, 223— 226, 355— 364
Stewart; APPLIED OPTICS, Vol. 1; p. 75, 1962.

*Primary Examiner*—James W. Lawrence
*Assistant Examiner*—A. L. Birch
*Attorneys*—Paul R. Harder and Robert J. Steinmeyer ABSTRACT: A nondispersive infrared analyzer having a source, flow cell, filter and detector is disclosed. The inlet to the flow cell may be switched from one of two intakes and the outlet is connected to a jet pump. With air flowing through the cell the zero suppression control is adjusted to reduce the signal input to the DC amplifier to zero. The calibration blade is started and the span control adjusted to provide a given upscale reading of the meter. The analyzer is then calibrated to provide a reading directly in concentration of the desired constituent.

PATENTED FEB 9 1971

3,562,522

*INVENTORS*
CARL N. CEDERSTAND
JAMES C. DAVIS
CHARLES A. KEENAN
JERROLD H. RANDALL

BY
*ATTORNEY*

NONDISPERSIVE IR ANALYZER AND METHOD FOR CALIBRATING

This invention relates generally to nondispersive infrared analyzers and more specifically to an analyzer particularly adapted for use in exhaust monitoring of internal combustion engines, Carbon dioxide, carbon monoxide and unburned hydrocarbons are emitted to the atmosphere by motor vehicle exhaust in varying quantities depending upon the engine condition and carburetion settings. One of the most toxic components of polluted air is carbon monoxide and with the increased interest and rising demand for control of air pollution it is becoming increasingly desirable to provide an efficient, inexpensive means of measuring the various pollutants emitted by motor vehicle exhausts.

Although emission control devices have been introduced in motor vehicle internal combustion engines to suppress air pollutants, it is desirable to provide a low cost, efficient apparatus for measuring various exhaust emissions not only to aid in the adjustment of such emission control devices but also in optimizing the carburetion setting and other adjustments to reduce undesired emissions.

The present invention relates to a nondispersive infrared analyzer of the single beam type which may be utilized in a low cost motor vehicle exhaust analysis system. The analyzer disclosed herein, is low in cost, may be readily calibrated both as to the zero and up-scale settings conveniently and without the necessity of standard gas tanks which would be prohibitive in garage type operations. The calibration system utilized herein does not require that the analyzer be calibrated on standard gases.

It is the general purpose of this invention to provide a low cost nondispersive infrared analyzer particularly adapted for use in motor vehicle exhaust analysis systems which may be readily calibrated both as to the zero and up-scale settings and which is sufficiently accurate to allow adjustment of emission control devices, carburetion and other settings of motor vehicle internal combustion engines for the purpose of reducing irritating emissions such as carbon dioxide, carbon monoxide and unburned hydrocarbons to acceptable levels.

Figure 2:
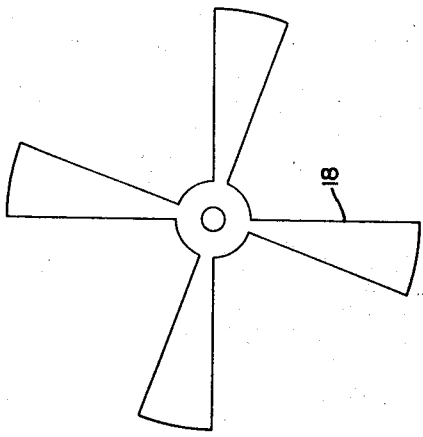

Other objects and many of the attendant advantages of this invention will become better understood by reference to the following detailed description when read in connection with the accompanying drawing and wherein;

FIG. 1 illustrates a schematic diagram of one preferred embodiment of the invention; and FIG. 2 illustrates the calibration blade in detail.

Referring now to FIG. 1 there is illustrated a nondispersive infrared analyzer of the single beam type having a source of infrared radiation 10, a flow-through cell 11 having infrared radiation transmitting windows 12 and 13 and a detector 14. Interposed between the source 10 and cell 11 is a motor driven chopper blade 16 driven by motor 17 at any suitable speed to chop the radiation emitted by source 10 at any suitable frequency such as 10 Hz. Also disposed between the source 10 and cell 12 is a calibration blade 18 driven by motor 19 and is utilized for the purpose of providing up-scale calibration of the instrument as more fully hereinafter described. In normal operation the calibration blade 18 is not driven and is arranged in such a manner such that the blades do not obstruct the path between the source 10 and cell 11. This may be conveniently accomplished by locating a small permanent magnet 20 closely adjacent the blade which will attract the blade and hold it in a static condition when the motor 19 is unenergized. Alternatively a system of weights that utilize the force of gravity to insure the proper static position of the blade may be utilized.

The inlet to flow cell 11 is connected to any suitable two-way valve 21 which, for example, may be operated by solenoid 22 so as to direct gas from either of inlet 23 or inlet 24 into cell 11. The outlet 26 of cell 11 is connected to a jet pump 27 which draws sample either from inlet 23 or 24 depending upon the position of valve 21 through the cell and exhausts it to the atmosphere.

Disposed between cell 11 and detector 14 is an infrared interference filter 28 of the narrow band-pass type which is selected to have a band-pass in the wavelength region in which the constituent of interest has an absorption band. The output of detector 14, which may be any suitable infrared detector such, for example, as a thermistor bolometer, is connected to a fixed gain AC amplifier 31 having its output connected to a rectifier-filter network 32 to provide a DC signal having an amplitude proportional to the output of the detector.

The output of the rectifier-filter network 32 is applied across resistor 33 which is also connected to one input of the high gain DC operational amplifier 34. Connected to the same input of DC amplifier 34 and across resistor 33 is the slider of potentiometer 35. Applied thereacross potentiometer 35 is a DC voltage of proper polarity depending upon the polarity of the signal from network 32 for the purpose of calibrating the zero setting of the analyzer as more fully described hereinafter.

The output of DC amplifier 34 is connected across any suitable indicating device which may be a recorder or, as illustrated in the drawing, a meter 37. A DC feedback to the other input terminal of operational amplifier 34 is provided by fixed resistor 38 and potentiometer 39, also connected across the output of the amplifier 34, the slider of potentiometer 39 being connected to the other input terminal of operational amplifier 34.

Referring now to FIG. 2 there is illustrated in greater detail the calibration blade having four alternate opaque sections and four intermediate open sections. If the blade is rotated at a speed sufficiently fast such that the detector is incapable of responding to the on-off periods of radiation, the effective intensity of the light reaching the detector through the blade will be reduced by the ratio of the opaque area to the total area. That is, in the example illustrated where there are four blades symmetrically placed about the axis of rotation, the effective percent transmittance through the blade is:

$$\text{Percent } T = \frac{\alpha_2}{\alpha_1} \cdot 100$$

where:
$\alpha_2$ = total open area
$\alpha_1 = 360°$

The calibration blade acts as a true neutral density filter which is not spectrally sensitive and which can be fabricated with a high degree of precision. Energy is not scattered or refracted as in the usual neutral density filter and, therefore, the position of the fan in the sample path does not change the amount of energy reaching the detector.

If the path length of sample cell 11 is tailored to bear a specific relationship to the infrared filter 28 the response of any sample gas may be made specific. If a calibration gas were used which did not have any absorption in the wavelength region passing the infrared filter, the response could be predicted exactly. As a consequence of this predictable response, any other means of attenuating the optical or electrical signal by a like amount could be used to calibrate the instrument readout in lieu of a calibration gas.

In operation, to calibrate the instrument both the zero and the up-scale calibrating points must be adjusted. In order to adjust the zero setting of the instrument, solenoid 22 is operated to switch valve 21 from inlet 23 to inlet 24 and ambient air is drawn through the sample cell 11 by the jet pump 27. Although ambient air may contain some quantities of the constituent of interest, these quantities are so low when compared to that emitted by the exhaust of an internal combustion engine that their presence does not significantly affect the calibration. With ambient air flowing through the cell, chopper 16 being rotated by motor 17 and the calibration blade 18 stationary and positioned such that no opaque section lies in the radiation path, no significant absorption takes place and the output of detector 14 is at a maximum value. The slider of potentiometer 35 is adjusted so as to cancel the DC signal output of rectifier-filter network 32 such that the input to the DC amplifier 34 is zero. Thus the zero control, i.e.

the slider of potentiometer 35, is adjusted until meter 37 reads zero.

With ambient air still flowing through the sample cell, motor 19 is energized such as by closing switch 41 and calibration blade 18 rotates providing a known amount of attenuation in the radiation path as hereinbefore described. Adjustment of the slider of potentiometer 39 in the feedback circuit of operational amplifier 34 changes the gain of amplifier 34 and determines the amount of input signal required to drive the meter to a given point up-scale. Assuming that the constituent of interest is one which obeys Beer's Law and since the path length of the cell is known, the meter 37 may be calibrated to read directly in concentration of a constituent. Switch 41 is opened and calibration blade 18 brought to a stop such that it has no opaque area in the path between source 10 and cell 11. Solenoid 22 is then deactuated so as to introduce gas from inlet 23 which may be connected to the exhaust of an internal combustion engine and the concentration of the constituent of interest measured. By selecting the band-pass of filter 28 to match an absorption band in the constituent of interest the instrument may be made selective to any desired component having an absorption band in the infrared region.

There has been illustrated and described a preferred embodiment of the invention which may be conveniently utilized in motor vehicle exhaust analysis systems. The analyzer may be readily and conveniently calibrated without the necessity of standard gases which greatly enhances its utility in such systems. Obviously many variations and modifications may be made and will be apparent to those skilled in the art without departing from the scope of the invention as defined in the appended claims.

We claim:

1. A nondispersive infrared analyzer for the detection of a constituent in a sample comprising:
   a flow cell having an inlet and an outlet;
   a radiant energy detector for providing an output signal proportional to the instantaneous radiant energy impinging thereon;
   a source of infrared radiation positioned to direct radiation through said cell to said detector;
   a calibration blade positioned in the radiation path from said source to said detector, said blade including segments transmissive to radiation wavelengths of interest and segments opaque to such wavelengths;
   drive means for rotating said blade;
   means holding said blade in a static position such that a transmissive segment is in the beam path when said drive means is unenergized;
   means for introducing air and a sample to said cell;
   circuit means including an indicator connected to said detector for indicating the output of said detector;
   means in said circuit means for adjusting said indicator to a first reading with ambient air in said cell and said blade in said static position; and
   means in said circuit means for adjusting said indicator to a second reading with ambient air in said cell and said calibration blade drive means energized.

2. The analyzer of claim 1 wherein said means for introducing air and a sample to said cell comprises valve means connected to the inlet of said cell and having a pair of inlets, said valve operable to connect either of said inlets to said cell inlet.

3. The analyzer of claim 1 further comprising:
   chopper means disposed in the radiation path for chopping the radiant energy;
   said circuit means including amplifying and rectifying means connected to said detector to provide a DC signal of polarity and amplitude indicative of the output of said detector;
   DC amplifier means connected to receive the output of said amplifying and rectifying means;
   said means for adjusting said indicator to a first reading comprising signal suppression means connected to the input of said DC amplifier to reduce the input signal to zero; and
   said means for adjusting said indicator to a second reading comprises a variable feedback circuit connected between the input and output of said DC amplifier means.

4. The method of calibrating an infrared analyzer having an indicator, a zero suppression circuit and a span control comprising the steps of:
   introducing ambient air into the sample cell of said analyzer;
   adjusting the zero suppression control to a first reading of said indicator;
   chopping the radiation in the beam path of said analyzer at a frequency greater than the response time of the detector; and
   adjusting the span control to a second reading of said indicator during the chopping of the radiation at said frequency.

5. The method of calibrating an infrared analyzer having a sample cell interposed in a beam path between a radiation source and a detector, an indicator, a zero suppression circuit and a span control and measuring selected constituents in the exhaust of an internal combustion engine comprising the steps of:
   chopping the radiation in the beam path of said analyzer at a first frequency less than the response time of the detector at all times during the calibration and measurement;
   introducing ambient air into the sample cell of said analyzer;
   adjusting the zero suppression circuit to provide a first reading of said indicator;
   chopping the radiation in the beam path of said analyzer at a second frequency greater than the response time of the detector;
   adjusting the span control to provide a second reading of said indicator during the chopping of the radiation at said second frequency;
   terminating the chopping of the radiation at said second frequency;
   introducing exhaust gases from an internal combustion engine into the sample cell of said analyzer; and
   providing a reading of said indicator.